United States Patent [19]

Kaufeldt

[11] 4,418,738
[45] Dec. 6, 1983

[54] DEVICE FOR AUTOMATICALLY TIGHTENING SPOKES IN SPOKE WHEELS

[76] Inventor: Roland Kaufeldt, Bovägen 6, Tyresö, Sweden

[21] Appl. No.: 253,219

[22] Filed: Apr. 13, 1981

[30] Foreign Application Priority Data

Oct. 17, 1979 [SE] Sweden .............................. 7908635

[51] Int. Cl.³ .............................................. B60B 1/04
[52] U.S. Cl. ................................................. 157/1.55
[58] Field of Search ...................... 29/159.02; 157/1.5, 157/1.55

[56] References Cited

U.S. PATENT DOCUMENTS 2,607,402  8/1952  Meydrech ........................... 157/1.5
3,620,281  11/1971  Hasegawa et al. ................. 157/1.55

FOREIGN PATENT DOCUMENTS 2027788  12/1970  Fed. Rep. of Germany .
2128155  10/1972  France .

Primary Examiner—Nicholas P. Godici
Assistant Examiner—Peter B. Martine
Attorney, Agent, or Firm—Laff, Whitesel, Conte & Saret

[57] ABSTRACT

A device and a method for automatically tightening spokes in spoke wheels. The device of the invention is used with a spoke wheel comprising a hub, into which spokes have been passed and extend through a wheel rim and are each provided with a loosely threaded spoke nipple at the outside of the rim. The device comprises means for clamping the hub and for engaging the outside and the edges of the rim as well as coupling means driven by prime movers for tightening the spoke nipples. The method proposes the steps of securely clamping the hub, securing the outside of the rim, subjecting the rim to a force in such manner that it becomes positioned in a single plane, and tightening each of the spoke nipples to an individual predetermined tightening torque.

7 Claims, 3 Drawing Figures

DEVICE FOR AUTOMATICALLY TIGHTENING SPOKES IN SPOKE WHEELS

BACKGROUND OF THE INVENTION

1. Field of the Invention

This invention refers to a device and a method for automatically tightening spokes in spoke wheels, primarily bicycle wheels.

2. Description of the Prior Art

In tightening spokes in bicycle wheels when manufacturing such wheels the procedure has normally been manual with a hand-held power-driven nipple tightener. For a normal bicycle wheel having 36 spokes the mentioned procedure is boring and tedious.

SUMMARY OF THE INVENTION

The present invention has the object of obviating the above-indicated disadvantages. More specifically the purpose of the invention is to provide a device and a method for automatically tightening each one of the nipples of the spokes included in a spoke wheel to a predetermined tightening torque so that the spoke wheel will achieve a maximum of rigidity simultaneously with skewing and warping being at an acceptable level. The means by which the object of the invention are achieved are disclosed in the accompanying claims.

BRIEF DESCRIPTION OF THE DRAWINGS

The invention will be described more specifically in the following with reference to the accompanying drawings, in which.

DESCRIPTION OF THE PREFERRED EMBODIMENT

Figure 1:
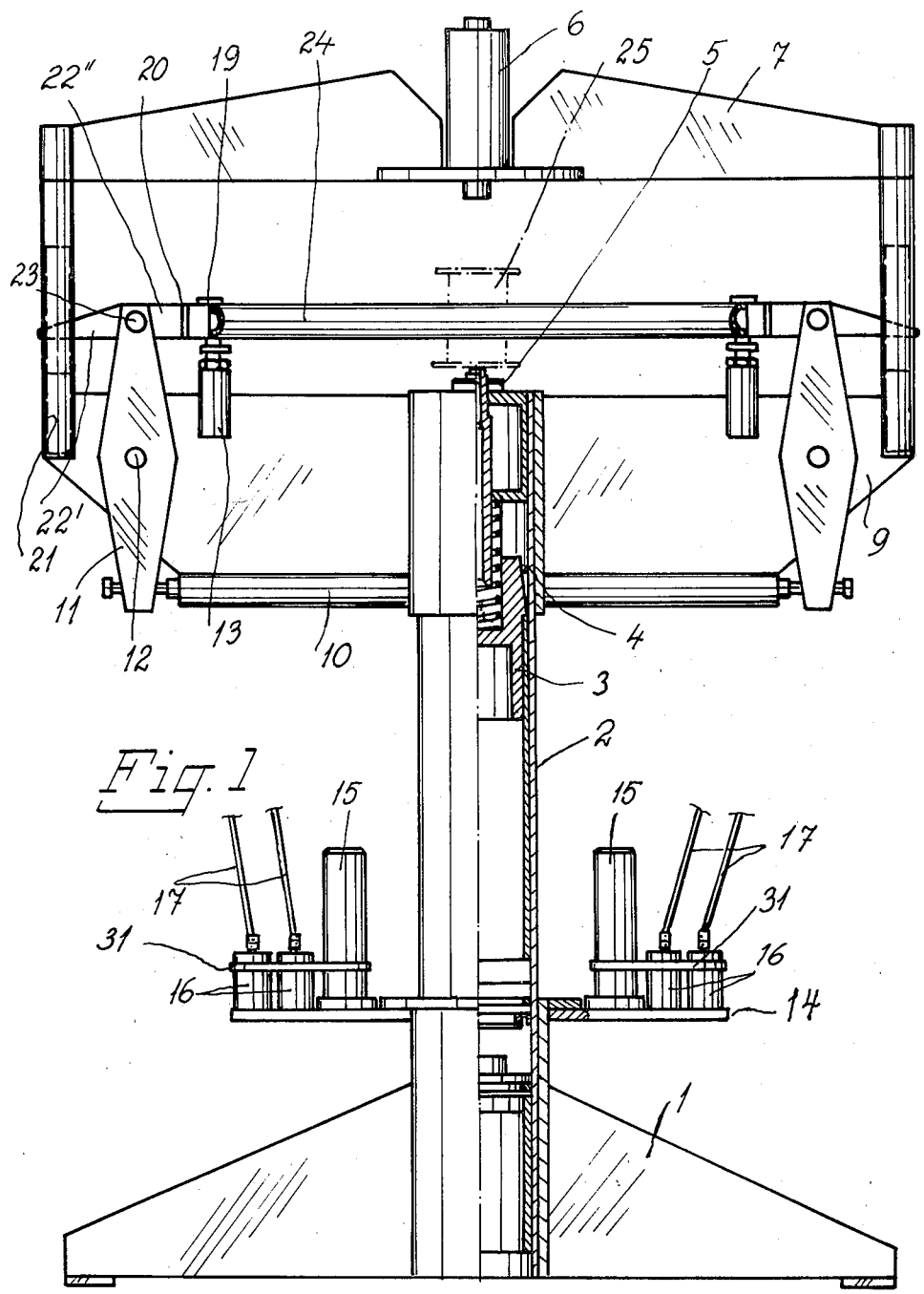
FIG. 1 shows a side elevation of a partly sectional view of a device in accordance with the invention for automatically tightening the spokes of a spoke wheel.

As may be seen from FIG. 1 the device of the invention in the illustrated embodiment comprises a support 2 carried by a base 1, said support comprising a vertical column having a hydraulic piston 3 extending therethrough, said piston being actuable by hydraulic pressure from below and having a conical and prismatic tapered member 4 at its upper surface. The upper portion 5 of the column is designed to receive one axial end of the hub 25 of a bicycle wheel, said hub being marked out by dot-dash lines. The hub 25 must be very accurately and firmly secured, and therefore the device of the invention is provided with clamp means, for example in the form of a hydraulic piston 6 which is urged down over the other axial end of the hub. Hydraulic piston 6 is secured to the support in appropriate manner, in this specific case by means of plates 7 extending to brackets 8 which are attached to support 2 by means of plates 9. In the position illustrated in FIG. 1 the hydraulic piston 6 is not depressed against the axial end of the hub.

At the same level as the conically tapered member 4 the support is provided with a number of spacer rods 10 which at one of their ends may be actuated by said conically tapered member 4 with each of their other ends being urged against one end of rocker 11 in consequence of such actuation, said rockers 11 being pivotal around respective central shafts 12 and having their other ends disposed for urging respective segment blocks 20 towards the periphery of a bicycle wheel rim which is intended to be placed in the device in the position marked out by the designation 24. One of said segment blocks 20 is illustrated more specifically in FIG. 2, in which it may be seen that the block is curved so as to follow the wheel rim which is marked out by dot-dash lines. Segment blocks of the same type as the illustrated block 20 are disposed along the entire circumference of the wheel rim. As the result of all of the spacer rods 10 being actuated as described, all of the segment blocks will be urged against the rim so as to clamp the latter in position towards its center. In order that the rim may be supported from below it engages support members taking the form of adjustable pins 13 which may be set to exactly the same mutual level at appropriate mutual distances along the circumference of the rim. These distances can preferably correspond to the center of each segment block 20.

Figure 2:
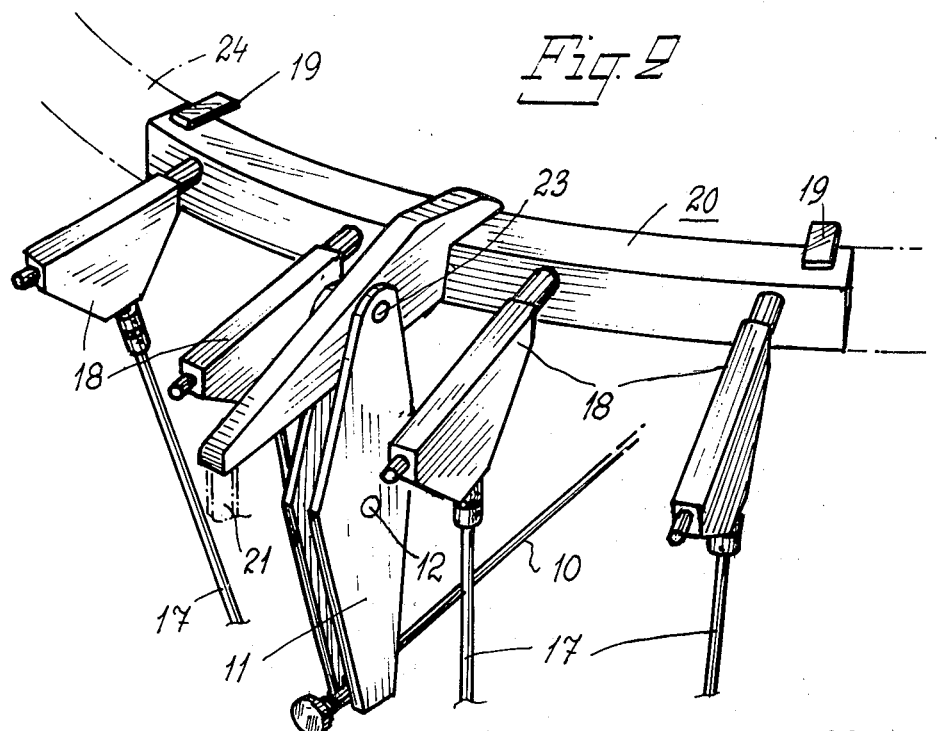
FIG. 2 shows a perspective view of a segment block comprising a portion of said device as well as cooperating means.
Figure 3:
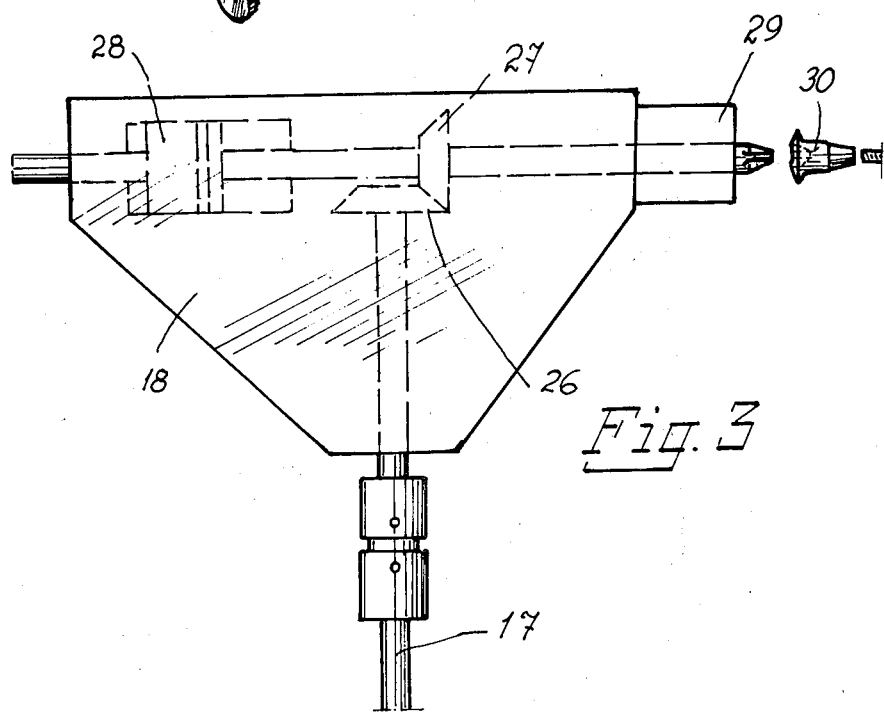
FIG. 3 shows an angular transmission comprising one of said cooperating means more in detail.

Immediately above the above-mentioned base 1 of support 2 a plate 14 carries a number of units (nine in the present case) each comprising a prime mover 15 which may drive a predetermined number of torque couplings 16, four in the illustrated case (two are concealed behind respective ones of the torque couplings 16 illustrated in FIG. 1), each of said torque couplings being connected to a respective angular transmission 18 via a respective articulated rod 17, with four of said angular transmissions 18 being associated with each segment block 20 in the manner illustrated in FIG. 2, viz. with the output shafts of the individual angular transmissions located at mutually equal distances along the circumference of segment blocks 20 and of the circumference of the wheel rim disposed therein. Each of the output shafts of said angular transmissions corresponds to an individual spoke of the bicycle wheel, and each of them is to be joined to an individual spoke nipple loosely threaded on the respective spokes of the bicycle wheel for tightening said nipples in manner to be described below. In order to avoid complicating the figure unnecessarily the angular transmissions 18 are not illustrated in FIG. 1. but one of them is shown in detail in FIG. 3, wherein it may be seen that the incoming articulated rod 17 drives a tool 29 by means of gears 26 and 27, said tool in turn engaging spoke nipple 30. In order that tool 29 engage spoke nipple 30 firmly the tool may be urged against the spoke nipple by means of for example a pneumatically or hydraulically actuated piston 28 when said nipple is to be tightened. Although the tool is shown comprising the tip of a screwdriver it might alternatively for instance be designed to engage a spoke nipple having an end in the form of a hexagon head.

In addition to the segment blocks 20 being capable of being urged radially against wheel rim 24 in the manner disclosed above they have another purpose which now will be described. Each segment block 20 is formed integrally, and as may be seen in FIG. 1 each segment block is mounted on an individual pin 23, whereby each of said blocks will comprise a two-arm lever with the respective arms 22' and 22". When the individual segment blocks 20 are in the radial engagement position against the rim described above hydraulic pistons 21, which may be urged against lever arm 22', may be subjected to a heavy hydraulic or pneumatic pressure so as to cause two or more projections 19 on each segment block to be urged against the upper side of wheel rim 24 so that the rim will firmly engage the pins 13.

The device disclosed by the invention operates in the following manner:

A prepared wheel rim, i.e. a rim with its associated hub and with spokes passed through said hub and the wheel rim and being provided with loosely threaded spoke nipples at the exterior of the wheel rim, is positioned in the device of the invention by one axial end of the hub being introduced into the upper portion 5 of support 2 whereafter said hub is secured in position by hydraulic piston 6 being urged down over its other axial end.

In the next phase hydraulic piston 3 is subjected to a low pressure from below, with its conically tapered member 4 being urged against spacer rods 10 so as to cause rocker arms 11 to pivot around their respective shafts 12 for urging segment blocks 20 forwardly into engagement with the circumference of the wheel rim with a predetermined force.

Hydraulic or pneumatic pressure is now applied to the above-mentioned hydraulic pistons 21 and the latter actuate lever arms 22' and pivot them around pins 23 so that the rim is forced downwards by means of the above-mentioned projections 19. Thus the rim will be urged firmly against pins 13 and will be disposed in one single plane in consequence of the applied pressure.

Thereafter hydraulic piston 3 is subjected to a higher pressure via conically tapered member 4 and spacer rods 10 as well as rocker arms 11, thereby causing the rim to be loaded equally from the outside and towards its center by means of all of the segment blocks 20 located along the circumference of the rim. In a normal bicycle wheel provided with 36 spokes the number of segment blocks 20 may for example be nine. In the described position the rim is loaded in similar manner to when it is in use.

The four angular transmissions 18 which are associated with each individual segment block 20 are distributed along said block in such manner that each of them will be positioned opposite to an individual spoke nipple, and prime movers 15, of which there is one for each segment block, are now made operative whereby the individual torque couplings 16 begin to rotate so as each to tighten an individual spoke nipple via articulated rods 17 and angular transmissions 18. The actuation of the torque couplings by prime movers 15 may for example be carried out by means of a drive belt 31 associated with each drive unit, and the tightening torque for each individual torque coupling may be set individually. When all of the torque couplings drag and thus have completed their tightening the current to the prime movers is cut off, whereupon everything is in order for removing the completed bicycle wheel. The bicycle wheel may be released in the opposite order to when it was introduced in accordance with the above.

It should be pointed out that although the invention has been described in connection with mounting a bicycle wheel having 36 spokes above, with nine segment blocks being utilized, each of which is associated with four spokes, it may of course be adapted to wheels having a greater or smaller number of spokes. For example, in wheels having 24 spokes it is probable that twelve segment blocks will be necessary, each having two nipple tighteners.

Hence the device is not limited to the embodiment described above and illustrated in the drawings, and this device is merely an example of the invention and its mode of utilization.

I claim:

1. A device for automatically tightening spokes in spoke wheels consisting of a hub, a plurality of spokes, and a wheel rim, said spokes being passed through apertures in said hub and wheel rim, respectively, and being provided with loosely threaded spoke nipples outside the periphery of the wheel rim, said device comprising
   clamping means,
   wheel hub support means,
   said clamping means being disposed to clamp the hub of a wheel to said wheel hub support means,
   wheel rim support means,
   said wheel rim support means being disposed to support the rim of the wheel,
   wheel rim engagement means comprising a plurality of segment blocks disposed along the periphery of the wheel rim, each of said segment blocks being actuable by a respective rocker arm,
   said wheel rim engagement means being further disposed to engage substantially the entire periphery of the wheel rim radially from the outside for causing said periphery to become accurately round and for urging the wheel rim toward the wheel hub,
   wheel rim urging means,
   said wheel rim urging means being disposed to urge the wheel rim toward said wheel rim support means, and
   automatic spoke nipple tightening means,
   said spoke nipple tightening means being disposed to tighten all of the spoke nipples of the wheel automatically and simultaneously, each with an individual predetermined torque.

2. A device in accordance with claim 1, wherein said wheel rim support means are adjustable so that their portions supporting the wheel rim may be located in a common plane.

3. A device in accordance with claim 1, wherein each rocker arm is actuable by a respective spacer rod which in turn is actuable by a conically tapered member.

4. A device in accordance with claim 3, wherein said conically tapered member is actuable hydraulically.

5. A device in accordance with claim 3, wherein said spoke nipple tightening means comprise prime movers, each associated with a respective one of said wheel rim engagement means and being adapted to drive four torque couplings, each of which automatically tightens an individual spoke nipple to a predetermined tightening torque.

6. A device in accordance with claim 5, wherein each of said torque couplings is disposed to tighten an individual spoke nipple through a respective angular transmission.

7. A device for automatically tightening spokes in spoke wheels consisting of a hub, a plurality of spokes, and a wheel rim, said spokes being passed through apertures in said hub and wheel rim, respectively, and being provided with loosely threaded spoke nipples outside the periphery of the wheel rim, said device comprising
   clamping means,
   wheel hub support means,
   said clamping means being disposed to clamp the hub of a wheel to said wheel hub support means,
   wheel rim support means,
   said wheel rim support means being disposed to support the rim of the wheel, wheel rim engagement means, said wheel rim engaging means comprising projections on one lever arm of a two-arm lever having another lever arm which is actuable by means of a hydraulic piston,
said wheel rim engagement means being further disposed to engage substantially the entire periphery of the wheel rim radially from the outside for causing said periphery to become accurately round and for urging the wheel rim toward the wheel hub, wheel rim urging means,
said wheel rim urging means being disposed to urge the wheel rim toward said wheel rim support means, and
automatic spoke nipple tightening means,
said spoke nipple tightening means being disposed to tighten all of the spoke nipples of the wheel automatically and simultaneously, each with an individual predetermined torque.

* * * * *